United States Patent [19]
Kariya

[11] Patent Number: 5,903,620
[45] Date of Patent: May 11, 1999

[54] SYSTEM SWITCHING CIRCUIT BASED ON PHASE MATCHING

[75] Inventor: Hiroshi Kariya, Tokyo, Japan

[73] Assignee: NEC Corporation, Tokyo, Japan

[21] Appl. No.: 08/884,129

[22] Filed: Jun. 27, 1997

[30] Foreign Application Priority Data

Jun. 28, 1996 [JP] Japan ................................. 8-188289

[51] Int. Cl.⁶ ............................ H04L 25/36; H04L 25/40
[52] U.S. Cl. ........................................................ 375/371
[58] Field of Search ................................ 375/354, 356, 375/362, 371, 373, 376, 328; 327/2, 144, 145

[56] References Cited

U.S. PATENT DOCUMENTS

5,673,004  9/1997  Park .......................................... 331/1 A
5,682,112  10/1997  Fukushima ............................. 327/147

FOREIGN PATENT DOCUMENTS

52438  1/1993  Japan .

*Primary Examiner*—Jason Chan
*Assistant Examiner*—Jean Corrielus
*Attorney, Agent, or Firm*—Sughrue, Mion, Zinn Macpeak & Seas, PLLC

[57] ABSTRACT

In a system in which a host apparatus having a double system (ACT and SBY systems) and a slave apparatus having a double system are provided, signals from the two systems of the host apparatus merge into each other and a signal from the ACT system of the host apparatus is selected by the slave apparatus, a system switching circuit is provided in which when the systems of the host apparatus are switched from one to the other and the slave apparatus performs data switching, the system switching is effected without causing a jump of data. In the slave apparatus, a phase difference between frame pulses indicative of heads of data pieces from the ACT system and SBY system of the host apparatus is counted by a clock having a frequency which n times (four times or more) the frequency of a clock of the host apparatus, and the phase of data of the SBY system is matched to the phase of data of the ACT system to permit switching free from data jumping.

3 Claims, 4 Drawing Sheets

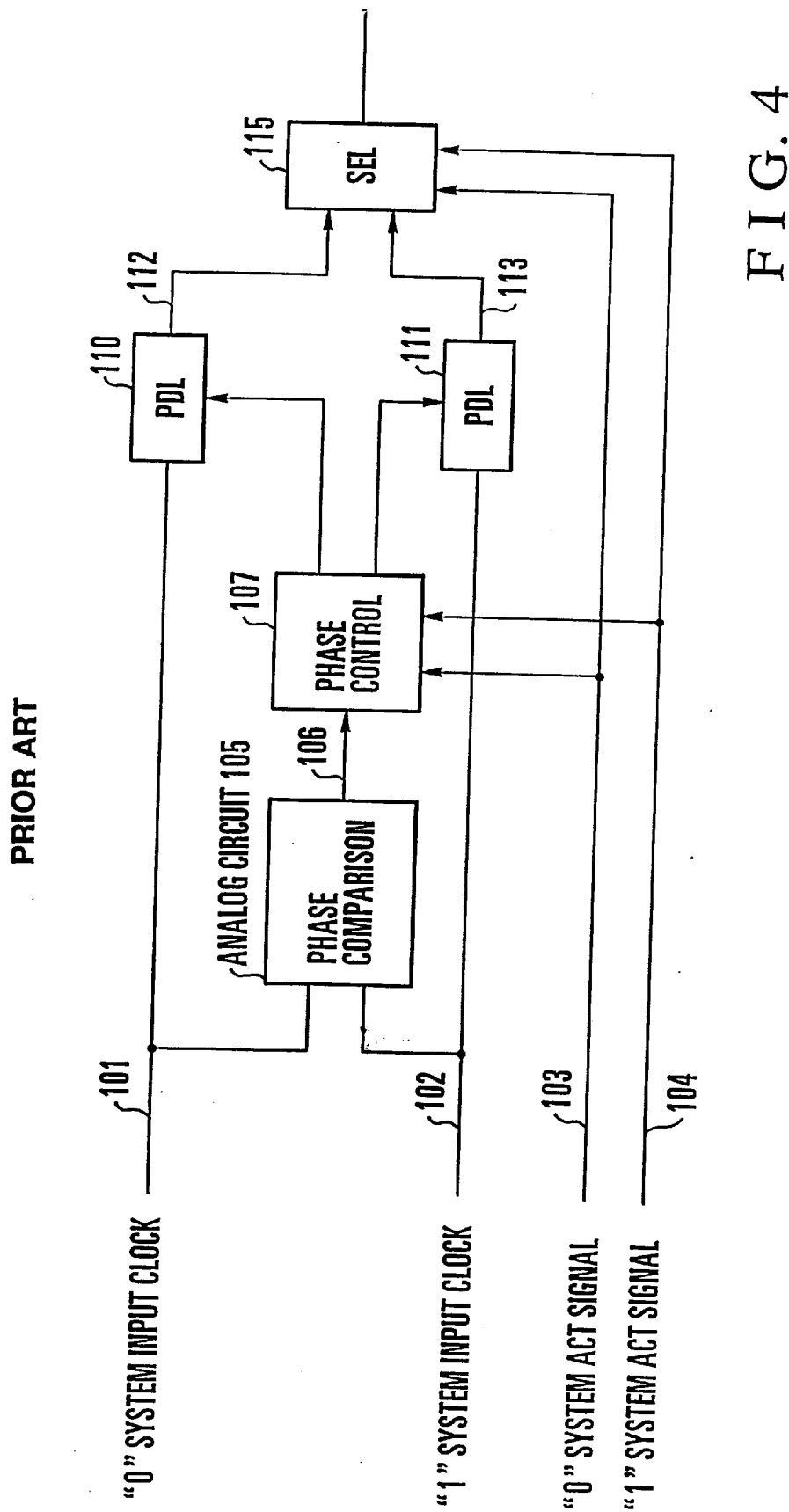

SYSTEM SWITCHING CIRCUIT BASED ON PHASE MATCHING

BACKGROUND OF THE INVENTION

The present invention relates to system switching circuits and more particularly to a system switching circuit for a system in which a host apparatus having an active (ACT) system and a hot-standby (SBY) system and a slave apparatus are provided, wherein signals from the two systems of the host apparatus merge into each other and a signal from the ACT system of the host apparatus is selected by the slave apparatus.

For example, JP-A-5-2438 proposes, as a system switching circuit for switching a serving system and a preliminary system, a circuit configuration capable of maintaining continuity of clocks upon clock switching. In the proposed circuit, a phase control signal for the clock of the serving system is fixed and a phase control signal for the clock of the preliminary system is changed in accordance with a clock phase difference signal delivered out of a phase comparator so that the phase of the clock of the preliminary system may always be matched to the phase of the clock of the serving system.

More particularly, a conventional circuit of this type as shown in FIG. 4 has a phase comparator circuit 105, which is an analog circuit, adapted to compare the phase of the clock of the serving system with the phase of the clock of the preliminary system. In the phase comparator circuit, a flip-flop is set and reset by rise edges of input clocks of "0" system and "1" system to produce a pulse signal having a pulse width corresponding to a phase difference between the clocks of the serving and preliminary systems, the pulse signal is integrated with time by means of an integrating circuit so as to be converted into a voltage value proportional to the phase difference, and the voltage value is converted into a clock phase difference signal 106 of parallel data by means of an analog/digital (A/D) converter. The clock phase difference signal 106 is delivered to a phase controller 107. The phase controller 107 acts on programmable delay lines (PDL's) 110 and 111 for phase adjustment which are provided for the serving and preliminary systems in such a way that the output data of the controller 107 is fixed for the PDL 110 of the serving system clock but the output data of the controller 107 is changed for the PDL 111 of the preliminary system clock in accordance with the clock phase difference to match the clock of the preliminary system to the phase of the clock of the serving system. A selector 115 receives the clocks 112 and 113 of "0" system and "1" system to select one of received "0" system ACT signal 103 and "1" system ACT signal 104 and delivers the selected signal. Since the clocks 112 and 113 of the "0" system and "1" system after the phase adjustment are always kept to be in phase, continuity of clocks can be maintained when switching is effected between the clocks of the serving and preliminary systems.

However, the above prior art describes its main purpose as being directed to only phase synchronization of clocks and gives no description of a system switching circuit for a system in which serial data and a pulse indicative of the head of the data are transmitted simultaneously.

Further, in the prior art, the comparison of clock phases is of the analog type using the integrating circuit which requires troublesome adjustments and cannot meet digital integration.

SUMMARY OF THE INVENTION

Accordingly, the present invention contemplates elimination of the above disadvantages and has its object to provide, in a system in which a host apparatus having a double system structure and a slave apparatus having a double structure are provided, signals from the two systems of the host apparatus merge into each other and a signal from the ACT system of the host apparatus is selected by the slave apparatus, a system switching circuit which can perform switching without causing a jump of data when switching occurs between the systems of the host apparatus and the slave apparatus switches data and can improve the reliability.

Another object of the present invention is to provide a system switching circuit which can simplify the circuit/apparatus construction.

To accomplish the above objects, according to the present invention, in a system switching circuit for a system in which a host apparatus having an active (ACT) system an a hot-standby (SBY) system and a slave apparatus are provided, signals from the two systems of the host apparatus merge into each other and a signal from the ACT system of the host apparatus is selected by the slave apparatus, the slave apparatus comprises a source for generating a clock CLK 1 having a frequency which is synchronous with a clock of the host apparatus and which is n times (4 times or more) the clock of the host apparatus, a phase comparator being responsive to the n-times clock for comparing frame pulse signals indicative of start positions of data blocks of "0" system and "1" system of the host apparatus, the "0" and "1" systems complementarily behaving as the ACT system or the SBY system, so as to determine a phase difference and for counting the phase difference as a phase deviation value of the phase of the SBY system relative to the phase of the ACT system to deliver phase comparison signals associated with the ACT and SBY systems, condition monitoring means for monitoring ACT system information of the host apparatus to generate a latch timing signal for latching the phase comparison signals of the phase comparator and a switching signal, and shift means for matching the phase of data and frame pulse from the SBY system of the host apparatus to the phase of data and frame pulse from the ACT system of the host apparatus in accordance with the phase comparison signals and the switching signal, whereby even when signals from the "0" system and "1" system of the host apparatus are out of phase with each other, the phase of data from the SBY system is matched with the phase of data from the ACT system.

BRIEF DESCRIPTION OF THE DRAWINGS

FIG. 4 is a block diagram showing a prior art.

DESCRIPTION OF THE PREFERRED EMBODIMENTS

The present invention will be described by way of example with reference to the accompanying drawings.

Figure 1:
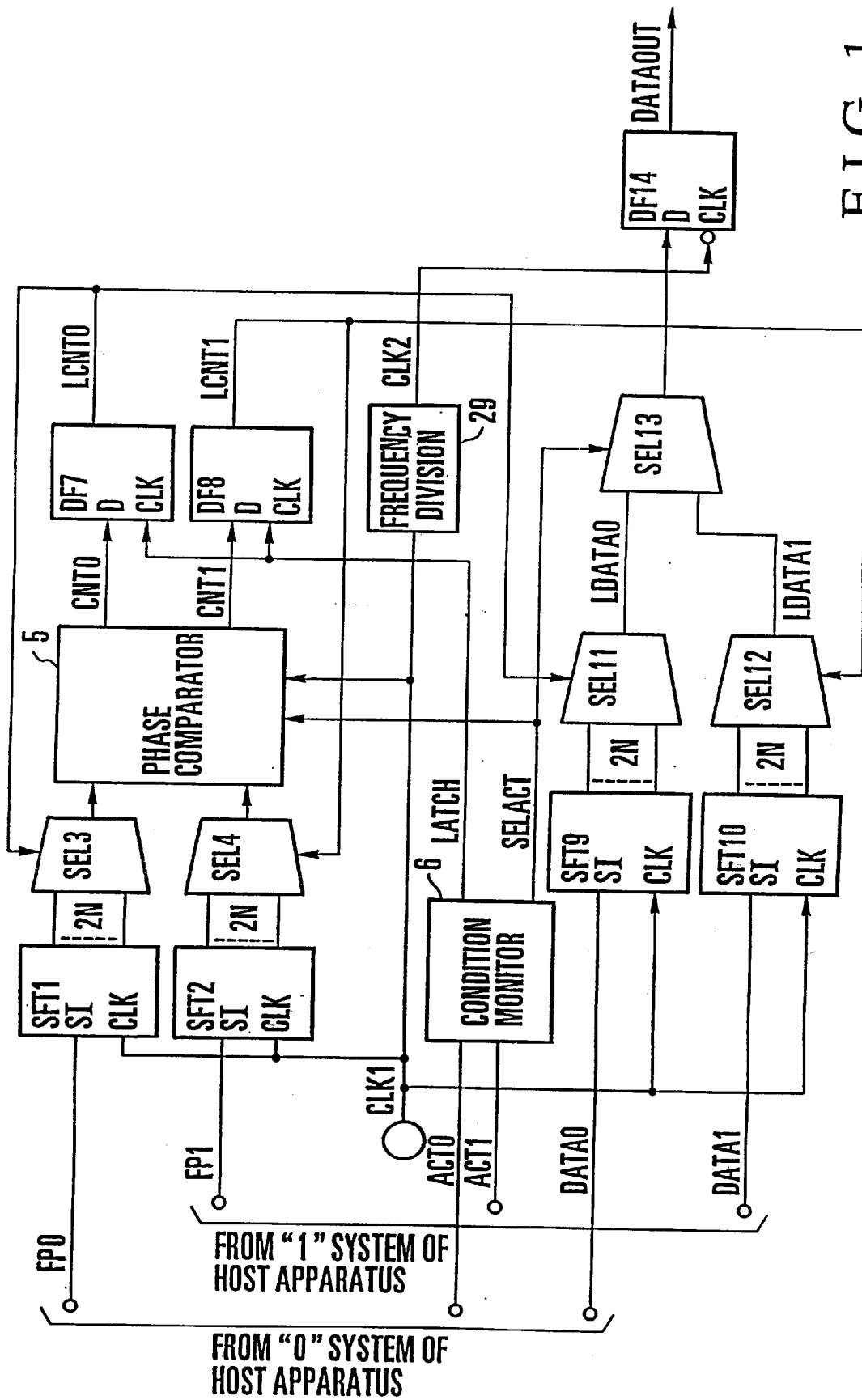
FIG. 1 is a block diagram showing the construction of an embodiment of the present invention.

Referring now to FIG. 1, there is illustrated, in block diagram form, an embodiment of a system switching circuit of the present invention.

The system switching circuit according to the present embodiment comprises shifters SFT1 and SFT2 for shifting frame pulses FP0 and FP1 indicative of start positions of data blocks from ACT system and SBY system of a host apparatus (not shown) by using a clock CLK1 generated by a slave apparatus of FIG. 1, selectors SEL3 and SEL4 responsive to selection control signals representing phase comparison signals to be described later to select outputs of the shifters SFT1 and SFT2, shifters SFT9 and SFT10 for shifting data DATA0 from the "0" system of the host apparatus and data DATA1 from the "1" system of the host apparatus, a phase comparator 5 being responsive to the clock CLK1 for determining a phase difference between the outputs of the selectors SEL3 and SEL4 and for counting the phase difference as a phase deviation value of the phase of the SBY system relative to the phase of the ACT system to deliver phase comparison signals associated with the ACT and SBY systems, a condition monitor 6 for generating a system switching signal SELACT in accordance with states of ACT signals ACT) and ACT1 from the "0" system and "1" system of the host apparatus and delivering a signal LATCH for latching the phase comparison output signals CNT0 and CNT1, D-type flip-flops DF7 and DF8 being responsive to the latch signal LATCH from the condition monitor 6 for latching the output signals CNT0 and CNT1 from the phase comparator 5 and for delivering a selection signal LCNT0 to the selectors SEL3 and SEL11 and a selection signal LCNT1 to the selectors SEL4 and SEL12, a selector SEL13 responsive to the switching signal SELACT from the host apparatus ACT signal condition monitor 6 for selecting output signals LDAT0 and LDAT1 from the selectors SEL11 and SEL12, and a D-type flip-flop DF14 responsive to the rise of a clock CLK2, obtained by frequency-dividing the clock CLK1 by means of a frequency divider 29 to ¼ in this example, to latch an output of the selector SEL13. The clock CLK1 has a frequency which is synchronous with the clock of the host apparatus and which is n times (four times or more) the frequency of the clock of the host apparatus.

Figure 2:
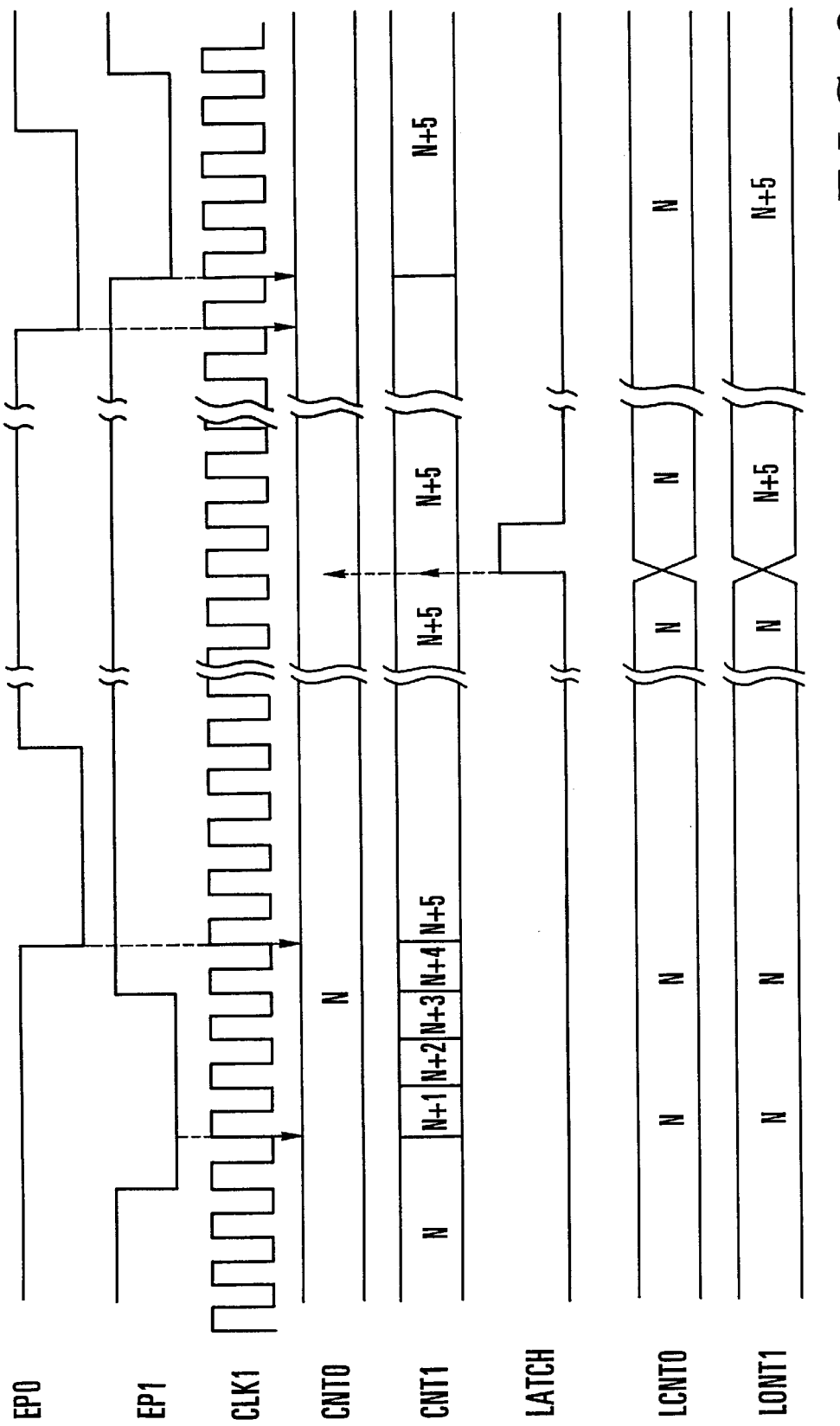
FIG. 2 is a timing chart showing the operation of a phase comparator in the embodiment of the present invention.
Figure 3:
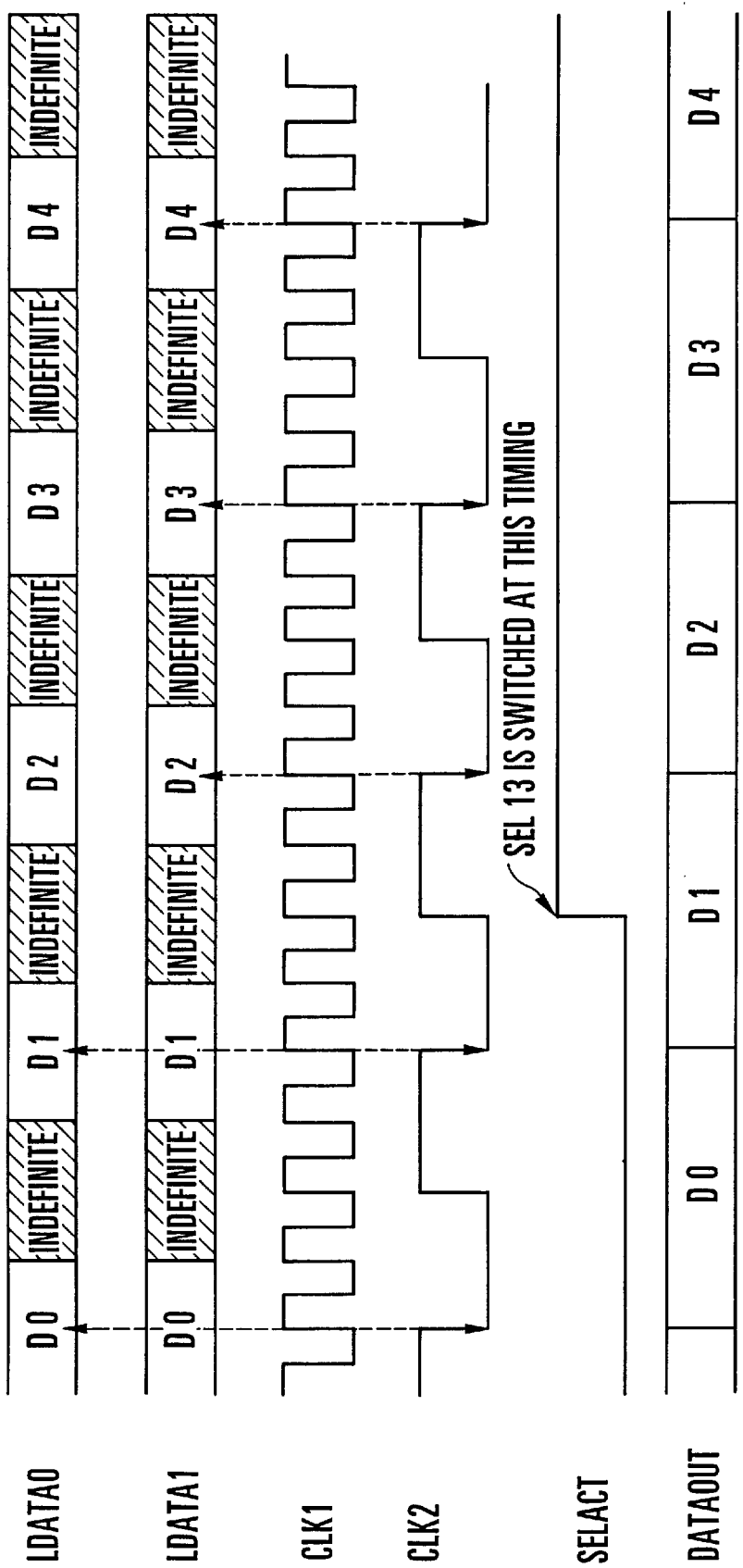
FIG. 3 is a timing chart showing details of system switching in the embodiment (in the case of four-times CLK1) of the present invention.

The present embodiment will be described in greater detail with reference to FIGS. 1, 2 and 3. FIG. 2 is a timing chart for explaining the operation of the phase comparator 5 and FIG. 3 is a timing chart for explaining the operation of the system switching circuit when the frequency of clock CLK1 is four times the frequency of the frame pulse in FIG. 1.

It is now assumed that the "0" system of the host apparatus is in the active (ACT) state and the "1" system of the host apparatus is in the hot-standby (SBY) state.

Then, when the frame pulse FP1 representing a data head position signal from the "1" system of the host apparatus is out of phase by, for example, 5 pulses of the clock CLK1 from the frame pulse FP0 representing a data head position signal from the "0" system of the host apparatus as shown in FIG. 2, the phase comparator 5 counts this phase difference (=5) and produces the output CNT0 for the ACT system which keeps an initial value "N" at the time of start of the counting of the phase difference and the output CNT1 for the SBY system which has the sum "N+5" of the initial value "N" and "5" of counted 5 pulses.

Subsequently, the condition monitor 6 responding to the signal ACT0 or ACT1 from the ACT system supplies the latch signal LATCH to the D-type flip-flops DF7 and DF8. Responsive to the LATCH signal, the D-type flip-flops DF7 and DF8 latch the output values (CNT0 and CNT1) of the phase comparator 5 to supply the latch output LCNT0 to the selectors SEL3 and SEL11 and the latch output LCNT1 to the selectors SEL4 and SEL12. The latch outputs LCNT0 and LCNT1 are synchronous with each other.

The selectors SEL4 and SEL12 responsive to the selection signal LCNT1 to select the shift outputs of the shifters SFT2 and SFT10 use this signal LCNT1 to deliver the +5 shifted pulse FP1 and +5 shifted data DATA1 of the "1" system to the phase comparator 5 and selector SEL13, respectively.

Each of the outputs LDATA0 and LDATA1 of the selectors SEL11 and SEL12 is sometimes dephase from the clock CLK1 by +1 pulse. But when the clock CLK1 is four times the clock of the host apparatus, even with the system switching of the host apparatus occurring followed by switching of the selection route, the switching can be completed without causing data distortion by switching the data DATA at the fall of the frequency-divided clock CLK2, as shown in FIG. 3. More specifically, as shown in FIG. 3, when the output SELACT of the condition monitor 6 changes from low to high in response to the signal ACT0 or ACT1 from the ACT system and the selector SEL13 is switched, the outputs LDATA0 and LDATA1 of the selectors SEL11 and SEL12 are indefinite but the output of the selector SEL13 is latched by the fall of the clock CLK2 by means of the D-type flip-flop DF14 to settle the data, thus preventing the data distortion from occurring upon switching.

Since "N" is latched for the "0" system by means of the D-type flip-flop DF7 and "N+5" is latched for the "1" system by means of the D-type flip-flop DF8 even after the system switching ends, the data signal DATA0 of the "0" system is in phase with the data signal DATA1 of the "1" system and no problem is encountered even when switching occurs again.

To sum up, the phase comparator 5 in FIG. 1 compares pulse signals (frame pulse signals FP0 and FP1 in FIG. 1) with the n-times clock (CLK1 in FIG. 1) and counts a phase difference for the SBY system, whereby results of the comparison by the phase comparator are latched in latch circuits (DF7 and DF8 in FIG. 1) by latch timing signals (LATCH1 and LATCH2 in FIG. 1) delivered out of condition monitoring means (6 in FIG. 1) adapted to receive ACT information (ACT0 and ACT1 in FIG. 1) to monitor the condition of the ACT information. The condition monitoring means (6 in FIG. 1) for monitoring the ACT information of the host apparatus generates a switching signal (SELACT in FIG. 1). Shift means (SFT9, SFT10, and SFT1, SFT2) is provided which matches data and the frame pulse from the SBY system of the host apparatus to the phase of the ACT system of the host apparatus in accordance with the comparison results of the phase comparator 5 in FIG. 1.

According to the embodiment of the present invention, when the maximum shift width between the pulses from the "0" system and "1" system of the host apparatus is ±N pulses of the clock (CLK1 in FIG. 1) which is synchronous with the clock of the host apparatus and which has a frequency being four times the frequency of the clock of the host apparatus, the shifters (SFT1 and SFT2 in FIG. 1) for shifting the data (DATA) and pulse (FP) are provided which have an output bit width of 2N bits (see FIG. 1) and the slave apparatus has an initial value of N after power is turned on.

As shown in a timing chart of FIG. 2, the phase difference between the frame pulse (FP) from the hot-standby SBY) system and the frame pulse (FP) from the active (ACT) system is counted using the clock CLK1, the shift width of the data is determined by the count value, and only the data for the SBY system is shifted.

For example, in the case of the clock (CLK1) having the four-times frequency, an indefinite portion of a width of +1 pulse of clock CLK1 is generated in the data signals LDATA0 and LDATA1 as shown in FIG. 3 but by switching the system at a definite portion, the switching operation can be carried out without any problem.

As described above, according to the present invention, when serial data pieces from the 2 systems of the host apparatus are out of phase with each other, system switching can be realized using only the shifters without resort to the serial/parallel conversion circuit, the elastic buffer and the analog circuit to attain reduction of the apparatus scale and elimination of adjustments, giving rise to suitability to integrated digital circuits.

What is claimed is:

1. A system switching circuit for a system in which a host apparatus having an active (ACT) system and a hot-standby (SBY) system and a slave apparatus are provided, signals from the two systems of the host apparatus merge into each other and a signal from the ACT system of the host apparatus is selected by the slave apparatus, said slave apparatus comprising:

a clock source for generating a clock having a frequency which is synchronous with a clock of said host apparatus and which is predetermined number n times a frequency of the clock of said host apparatus;

phase comparator means being responsive to the clock generated by the clock source for comparing frame pulse signals indicative of start positions of data blocks of first and second systems of said host apparatus, said first and second systems complementarily functioning as said ACT system or said SBY system, to determine a phase difference and for counting the phase difference as a phase deviation value of the phase of said SBY system relative to the phase of said ACT system to deliver phase comparison signals associated with said ACT and SBY systems;

condition monitoring means for monitoring ACT system information of said host apparatus to generate a latch signal for latching the phase comparison signals of said phase comparator and a switching signal; and shift means for matching the phase of data and frame pulse from said SBY system of said host apparatus to the phase of data and frame pulse from said ACT system of said host apparatus in accordance with the phase comparison signals and the switching signal, whereby even when signals from said first system and said second system of said host apparatus are out of phase with each other, the phase of data from said SBY system is matched with the phase of data from said ACT system.

2. A system switching circuit according to claim 1, wherein said clock generated by said clock source is at least four times the frequency of the clock of the host apparatus.

3. A system switching circuit according to claim 1, wherein said phase comparator means counts the phase difference between the frame pulse signals from said first system and second system of said host apparatus on the basis of the clock generated by said clock source having the frequency which is predetermined times the frequency of the clock of the host apparatus to deliver the phase comparison signals, and said shift means shifts the frame pulse and data from said SBY system of said host apparatus on the basis of the phase comparison signals from said phase comparator means to match the phase of the frame pulse and data to the phase of the frame pulse and data from said ACT system of said host apparatus, whereby a data signal of said first system and second system which is selected by the switching signal is latched by a clock obtained by frequency-dividing the clock signal generated by the clock source.

* * * * *